United States Patent
Preick et al.

(10) Patent No.: US 10,695,969 B2
(45) Date of Patent: Jun. 30, 2020

(54) APPARATUS FOR FEEDING AN EXTRUDER

(71) Applicant: TROESTER GmbH & Co. KG, Hanover (DE)

(72) Inventors: Dennis Preick, Springe (DE); Wieland Hoffmann, Hannover (DE); Eugen Renz, Laatzen (DE)

(73) Assignee: TROESTER GMBH & CO. KG, Hannover (DE)

( * ) Notice: Subject to any disclaimer, the term of this patent is extended or adjusted under 35 U.S.C. 154(b) by 96 days.

(21) Appl. No.: 15/674,543

(22) Filed: Aug. 11, 2017

(65) Prior Publication Data

US 2018/0044118 A1    Feb. 15, 2018

(30) Foreign Application Priority Data

Aug. 12, 2016  (DE) .................. 10 2016 115 049

(51) Int. Cl.
  *B29C 48/285*     (2019.01)
  *B29C 48/25*      (2019.01)

(52) U.S. Cl.
  CPC ...... *B29C 48/2888* (2019.02); *B29C 48/2528* (2019.02); *B29C 48/2567* (2019.02)

(58) Field of Classification Search
  CPC ............ B29C 48/2888; B29C 48/2567; B29C 48/2528; B29C 48/395; B65H 21/00; B65H 20/06; B65H 20/02; B65G 47/19
  See application file for complete search history.

(56) References Cited

U.S. PATENT DOCUMENTS

| | | | | |
|---|---|---|---|---|
| 1,980,154 A | * | 11/1934 | Coe ................. | B21D 39/03 24/20 EE |
| 2,384,521 A | * | 9/1945 | Andersen .......... | B29C 48/2888 264/211 |
| 2,829,714 A | * | 4/1958 | Kalb .................. | B65B 13/305 29/21.1 |
| 3,396,429 A | * | 8/1968 | Geyer ............... | B29C 48/2888 425/147 |
| 3,396,459 A | | 8/1968 | Freehauf et al. | |

(Continued)

FOREIGN PATENT DOCUMENTS

| CN | 101081539 A | * | 12/2007 |
|---|---|---|---|
| DE | 1928293 A1 | | 12/1970 |

(Continued)

*Primary Examiner* — Joseph S Del Sole
*Assistant Examiner* — Jerzi H Moreno Hernandez
(74) *Attorney, Agent, or Firm* — Leydig, Voit & Mayer, Ltd.

(57) ABSTRACT

An apparatus for feeding a screw-type extruder with material strips made of rubber mixtures or plastics mixtures, which strips are arranged in a folded zig-zag shape and can be supplied by means of at least one conveyor belt to a supply region of a supply element that is funnel-shaped, at least in portions, and an extruder. A motor-driven conveyor device for the material strip is arranged within the supply region, which device comprises a pressure surface that can abut the surface of the material strip and can be moved in a reversing manner. Said pressure surface only abuts the surface of the material strip in the conveying direction and, in the direction opposite the conveying direction, it adopts a return position in which it is spaced from the surface of the material strip.

14 Claims, 7 Drawing Sheets

(56) References Cited

U.S. PATENT DOCUMENTS

| | | | | |
|---|---|---|---|---|
| 3,712,773 | A | * | 1/1973 | Baumgarten ....... B29C 48/2888 425/142 |
| 3,750,923 | A | | 8/1973 | Klein |
| 3,768,800 | A | * | 10/1973 | Gutknecht .......... B65H 45/103 270/30.05 |
| 3,800,894 | A | | 4/1974 | Keser |
| 4,286,882 | A | * | 9/1981 | Schiesser ................ B29C 48/92 366/76.2 |
| 4,585,602 | A | * | 4/1986 | Capelle .............. B29C 48/2888 264/176.1 |
| 5,855,927 | A | * | 1/1999 | Uth ...................... B29C 48/465 425/183 |
| 6,129,872 | A | * | 10/2000 | Jang ........................ B29C 41/36 264/75 |
| 2002/0126567 | A1 | * | 9/2002 | Fischer .............. B29C 48/2888 366/83 |
| 2005/0056991 | A1 | * | 3/2005 | Sullivan ................ B65H 3/063 271/265.01 |
| 2008/0111016 | A1 | * | 5/2008 | Ackerman ............. B65H 20/04 242/416 |

FOREIGN PATENT DOCUMENTS

| | | | | |
|---|---|---|---|---|
| DE | 1961632 | A1 | | 6/1971 |
| DE | 2244059 | A1 | | 3/1974 |
| DE | 2250542 | A1 | | 4/1974 |
| DE | 2250542 | A1 | * | 4/1974 ......... B29C 48/2888 |
| DE | 2364539 | A1 | | 7/1975 |
| DE | 7710535 | U | | 8/1977 |
| DE | 2659525 | A1 | * | 7/1978 ......... B29C 48/2888 |
| DE | 2837463 | A1 | | 3/1979 |
| DE | 2746187 | B1 | | 4/1979 |
| DE | 232876 | A1 | | 2/1986 |
| DE | 3505128 | A1 | | 8/1986 |
| JP | S53160475 | U | | 12/1978 |
| JP | H065934 | U | | 1/1994 |
| JP | H0679521 | U | | 11/1994 |

* cited by examiner

APPARATUS FOR FEEDING AN EXTRUDER

CROSS-REFERENCE TO RELATED APPLICATIONS

Priority is claimed to German Patent Application No. DE 10 2016 115 049.5, filed on Aug. 12, 2016, the entire disclosure of which is hereby incorporated by reference herein.

FIELD

The invention relates to an apparatus for feeding an extruder.

BACKGROUND

In practice, when feeding screw-type extruders with rubber mixtures and/or thermoplastic masses, the operation of apparatuses of this kind relies on a high degree of continuity of the material composition and the feeding in order to achieve optimum results.

In most cases, the mixtures to be processed are delivered on pallets in the form of long strips, known as milled sheets, and are supplied to the screw-type extruder by conveyor belts, as is known for example from DE 23 64 539 A1.

In the case of the zig-zag or wig-wag mixtures in the form of milled sheets, the beginnings of the milled sheets are introduced directly into the feed unit or into the extruder funnel by hand or by means of specially developed auxiliary apparatuses. Subsequently, the mixture in the form of a milled sheet, optionally also two or more mixtures in the form of milled sheets, automatically continues on until the pallet is empty. A prerequisite in this case was also that the overall cross section of the mixture strip(s) matched, as far as possible, the optimum material reception by the extruder.

A feeding that is possibly too low as a result of a strip cross section that is too small results in a screw that is not sufficiently filled in this method, which can disadvantageously impact the plastification effect of the extruder and leads to significant underperformance. A milled sheet feeding cross section that is too large, however, results in obstruction of the funnel and disruptions to, or even interruptions of, the feeding.

An apparatus for automatically heating elastomer material in screw presses is known for example from DE 28 37 463 A1. Said apparatus comprises at least one intake roller for mixture material, which roller is arranged in front of the extruder screw with spacing therefrom and is driven independently of the screw. In this case, the material is supplied to the extruder by means of a funnel that is arranged in front of the extruder screw with spacing therefrom and is driven independently of the screw. Hydraulic motors are suitable as drives.

DD 2 32 876 A1 relates to an apparatus for continuously feeding an extruder by means of a draw-in roller and a draw-off roller that is upstream of the filling opening in the extruder. The combination of the draw-off roller and a counter-roller is intended to result in the draw-off and deceleration of the feed strip, where necessary.

In this case, in addition to the need for even feeding, it is also necessary to have an economical, largely automated operation. Depending on the intended use, there is also the desire to feed in two or more milled sheets at the same time, as a result of which a certain inevitable lack of homogeneity of the mixture disappears during the continuous shaping process.

In practice, the milled sheets are often fed simply by hand. Following the development of large screw-type extruders for cold feeding that have a high throughput capacity, this work has, however, reached its limits, and therefore the transition has been made to mechanical feeding.

DE 27 46 187 B1 discloses an apparatus for the controlled supply of a strip-shaped rubber mixture into the input opening in a screw machine comprising a funnel-shaped intake shaft that is arranged between a supply device and the input opening. A flap valve to which a constant tilting moment is applied covers the entire passage cross section of the intake shaft. A switch device for triggering switching pulses is provided in the end of the flap valve that projects rearwardly from the intake shaft in order to control the supply device by means of fixed proximity switches.

DE 22 44 059 C3 describes a supply apparatus for uniformly feeding, by weight, strip portions of a rubber mixture into a screw machine.

DE 19 61 632 A1 discloses an apparatus for supplying a rubber or plastics strip into the feed hopper, in which apparatus the conveyor and a cutting device are driven on the basis of the fill level of the feed hopper. In the process, the fill level of the feed hopper is read photoelectrically.

In another apparatus, known from DE 19 28 293 C3, screw presses are fed with plastically deformable materials by means of a controlled supply of a continuous strip, the supply of which being controlled by detecting the bead forming in the filling funnel of the screw press by means of a brake apparatus acting on the strip.

In an apparatus known from DE 77 10 535 U, the material supply is corrected as a result of a material jam in the feed opening to the extruder.

Furthermore, DE 35 05 128 A1 relates to an apparatus for producing films from a backing sheet made of thermoplastic material. A pair of draw-off rollers for the elastomer feed strip are rotated by an additional, controllable drive.

SUMMARY

An aspect of the invention provides a apparatus for feeding an extruder, the apparatus comprising: material strips including a rubber mixture and/or plastic mixture, the material strips being configured to be supplied using at least one conveyor to a supply region of a supply element, the supply region being funnel-shaped, at least in portions, and to the extruder; a motor-driven conveyor device, configured for at least one material strip, arranged within the supply region, wherein the conveyor device includes a pressure surface configured to abut a material strip surface and wherein the pressure surface is configured to be moved in a reversing manner, and, during a movement, abuts the material strip surface in a conveying direction and is spaced therefrom in an opposite direction.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
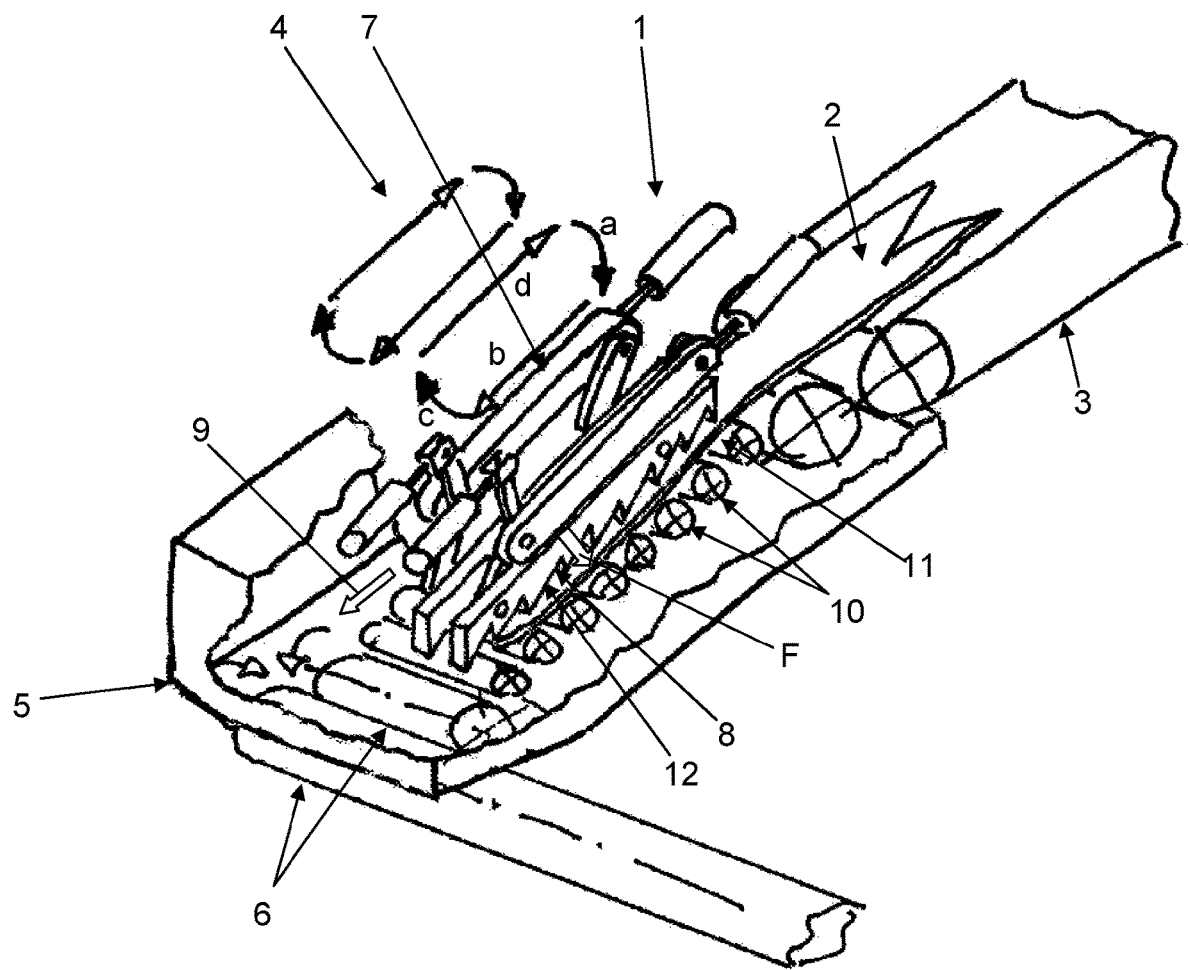
FIG. 1 a conveyor device comprising a pressure surface that can be driven in a reversing manner, within a funnel-shaped supply region.

An aspect of the invention provides an apparatus for feeding an extruder, which is in particular designed as a screw-type extruder, with material strips made of rubber mixtures and/or plastics mixtures, which strips are in particular arranged in a zig-zag or wig-wag shape and can be supplied by means of at least one conveying means to a supply region of a supply element, which region is funnel-shaped, at least in portions, and to the extruder, a motor-driven conveyor device for the material strip being arranged within the supply region.

An aspect of the invention provides an apparatus for the controlled, uniform supply of material strips, by means of which it is possible to achieve simplified and homogenized feeding and simplified operation.

According to an aspect of the invention, an apparatus is thus provided in which the conveyor device comprises a pressure surface which can abut the surface of the material strip and can be moved in a reversing or revolving manner, which pressure surface abuts the surface of the material strip in the conveying direction and is spaced from said strip in the direction opposite the conveying direction. As such, the compressive or frictional force required for the transport, and which sequentially transports the material in the conveying direction in each case, is applied by means of the pressure surface only in the conveying direction. In the process, either the contact pressure results from stroke control, such that a certain distance is maintained with respect to a surface used as an abutment, or the force transferred to the material is detected and, once a target value has been reached, a further advancement of the pressure surface with respect to the material is prevented. As a result of this, a reliable supply of the material strip can be ensured even if the amount of the supplied material varies, which is the case for example when a plurality of layers of the material strip unintentionally adhere together and are then supplied together by means of the conveyor belt. Manual access to the supply region is therefore no longer required. Rather, according to the invention, the conveyor device undertakes the supply of the material within the funnel-shaped supply element and thus at the same time prevents an undesirable backlog of the material.

Preferably, the motor-driven conveyor device is arranged within the supply region for the material strip and extends between an inlet and a gap in the draw-in roller.

The complete sequence of movements thus begins, in an aspect of the invention, with an advancing movement of the pressure surface with respect to the material, which movement takes place substantially perpendicularly to the surface of the material. As soon as the target position that is suitable for transmitting force has been reached, the introduction of a translational movement in the conveying direction begins, the pressure surface acting as a carrier or slider. As a result of this movement, the material is moved by a certain amount in the direction of the extruder. As soon as this translational end position has been reached, the pressure surface is detached from the surface of the material and is moved back into the initial position without intervention. The entire movement sequence preferably takes place in one continuous operation.

A plurality of pressure surfaces can be arranged one after the other in the conveying direction. According to a particularly preferred embodiment of the invention, the conveyor device comprises at least two pressure surfaces which are arranged in parallel with one another in the conveying direction and which are operated anti-cyclically or counter-cyclically such that the pressure surfaces alternately engage with the material strip. As a result of this, there is always at least one pressure surface acting on the material strip, and therefore an undesirable and uncontrolled movement of the material strip in the direction opposite the conveying direction, caused by a build-up of material, can be reliably avoided.

According to a further, simplified variant of the conveyor device, the pressure surface can be driven so as to move translationally, in a reversing manner, in a single plane, the pressure surface being formed, at least in portions, by a plurality of rollers provided with a common freewheel or each having one freewheel. As a result, a simple reversing movement in a single plane is sufficient, the rollers provided with the freewheel being blocked in the conveying direction in terms of the degree of rotational freedom thereof, and said rollers can therefore produce the desired conveying movement by means of the frictional force between the rolling surface of the rollers and the material, and they can roll freely on the material in an opposite direction.

A preferably planar inner wall surface of the funnel-shaped supply region is used in this case as an abutment for the contact pressure. Here, the pressure surface is not limited to a planar shape. Rather, the pressure surface can comprise regularly or irregularly recurring deformations as projections or depressions in a direction that is transverse to the conveying direction. In addition, the pressure surface may be for example convex and adapted to the inner wall surface of the funnel.

Such a preferred embodiment of the pressure surface is implemented by the pressure surface having a profile that is in particular sawtooth-like. As a result, the transmission of force is further improved in the conveying direction, it being possible to provide additional scrapers in order to prevent adhesion to the profile, which scrapers are applied when the pressure surface is reset against the material, and which separate said material from the pressure surface.

The inner wall surface of the funnel is used as an abutment for the material. Furthermore, it has already proven to be particularly practical for the conveyor device to comprise a bearing surface for the material, which surface comprises free-running rollers such that the frictional resistance occurring during the forward movement can be reduced.

Alternatively, a variant in which the material is enclosed between two pressure surfaces that are driven so as to move in synchronization can of course also be implemented.

In an additional, particularly practical variant of the invention, the pressure surface is formed by the peripheral surface of a plurality of motor-driven rollers, which are arranged one after the other in the conveying direction, in order to thus achieve the conveying effect, it being possible for the driven rollers to act on one side or on both sides of the material.

According to a particularly preferred further modification according to the invention, the conveyor device comprises an endlessly revolving belt, which is operated in particular continuously. The material can of course also be enclosed between two opposing belts in order to achieve a particularly reliable material supply. In addition, the conveyor belt, which is for example designed as a fabric belt or a modular belt, can be integrated in the existing conveyor belts without any problems.

Furthermore, according to a particularly preferred embodiment of the invention, the conveyor device comprises a return stop so that the material cannot leak out of the supply region in the direction opposite the conveying direction. For this purpose, the return stop has for example a shut-off valve, which the material strip can only pass in the conveying direction.

Another particularly promising embodiment of the invention is achieved by the supply region being delimited by a delimiting surface that is helical, at least in portions, in particular being delimited by a wall surface of the supply element such that a first edge of the material strip is pushed beneath the opposite edge of the material strip. As a result, a particularly compact shape of the material strip is achieved not by said strip being compressed in the direction that is transverse to the conveying direction, but by said strip being rolled by the delimiting surfaces. In this case, a significant effect is achieved on account of different bend radii of the opposing delimiting surfaces, as a result of which the edge of the material strip meeting the lower bend radius forms the core of the roll or winding, and the opposite edge of the material strip is positioned against the periphery of said core. This results in a tight roll or winding having a periphery that becomes increasingly smaller in the conveying direction. The delimiting surface can in this case be a separate guide element within the supply region, or a component of the wall surface of the supply element.

Another equally particularly expedient modification of the invention also results from the apparatus comprising a splicing device having a stamp for inserting a non-annular, closed separation line into at least two superimposed material strips. Insofar as, by means of a stamp, a region of the first material strip, which region corresponds to the stamp surface, is separated, in portions, from the adjacent regions of the material and displaced into the plane of the material strip lying therebelow, this leads to mechanical clamping on account of an undercut, and thus to a form-fit connection. As a result, material strips that are arranged one after the other in the longitudinal direction are reliably connected within an overlapping region and can be supplied to the extruder without interruption. In addition to planar surfaces as an abutment, contoured dies are also suitable as a support for the stamp.

Particularly preferably, the separation line is limited to one portion, in particular of no greater than 80%, preferably no greater than 50%, of the peripheral contour of the stamp such that a complete cut-out of the stamp surface from the material strip is avoided and the region remains connected to the material strip at least in one region. As a result, the mechanical clamping is further optimized and undesirable material losses are avoided.

A further, equally particularly promising embodiment of the invention is achieved by the splicing device comprising a pressure pad that can be moved relative to the stamp in order to detach the stamp from the material strip. As a result, following the stamping, undesirable adhesion and subsequent lifting of the material strip when the stamp is withdrawn is avoided. For this purpose, the pressure pad may for example be a radial projection which annularly surrounds the stamp, is for example collar-shaped and comprises a planar contact surface. Following the stamping, the pressure pad remains in its holding position in which it abuts the surface until the stamp is completely withdrawn.

In addition, according to a further embodiment of the invention, the splicing apparatus can be provided with a heating element for local heating in order to improve the adhesion.

The apparatus 1 according to the invention for feeding a screw-type extruder with material strips 2 made of rubber mixtures or plastics mixtures is described in more detail in the following on the basis of FIGS. 1 to 7. The material strips 2 are initially arranged in a folded zig-zag or wig-wag shape and are supplied by means of at least one conveyor belt 3 to a supply region 4 of a supply element 5 that is funnel-shaped, at least in portions, and to an extruder 6.

As can be seen in FIG. 1, a motor-driven conveyor device 7 for the material strip 2 is arranged within the supply region 4 between an inlet and a draw-in roller of the extruder 6, which device comprises a pressure surface 8 which can abut the surface of the material strip 2 and can be moved in a reversing manner. Said pressure surface only abuts the surface of the material strip 2 in the conveying direction 9 and, in the direction opposite the conveying direction 9, it adopts a return position (only shown by dotted lines) in which it is spaced from the surface of the material strip 2. In addition, a waiting position (likewise only shown by dotted lines), in which the pressure surface has even greater spacing from the surface of the material strip and in which the conveyor device 7 is more easily accessible, can also be set.

The movement sequence follows a cycle comprising four substantially translational movement steps a, b, c, d, the pressure surface 8 and its sawtooth-like profile 12 being moved, initially, by an advancing movement in the direction of the material strip 2 and, subsequently, translationally in parallel with the conveying direction 9 by a predetermined amount in the direction of the extruder 6, such that the compressive force F required for the transport or the frictional force derived therefrom is transmitted to the material strip 2, which, as a result, is transported in the conveying direction 9. The reversing movement follows a return movement counter to the advancing movement in order to detach the pressure surface 8 from the material strip 2.

A bearing surface 11 formed by a plurality of rollers 10 that are free to rotate is used as an abutment for the material strip 2, as shown in FIGS. 1 to 5.

Figure 2:
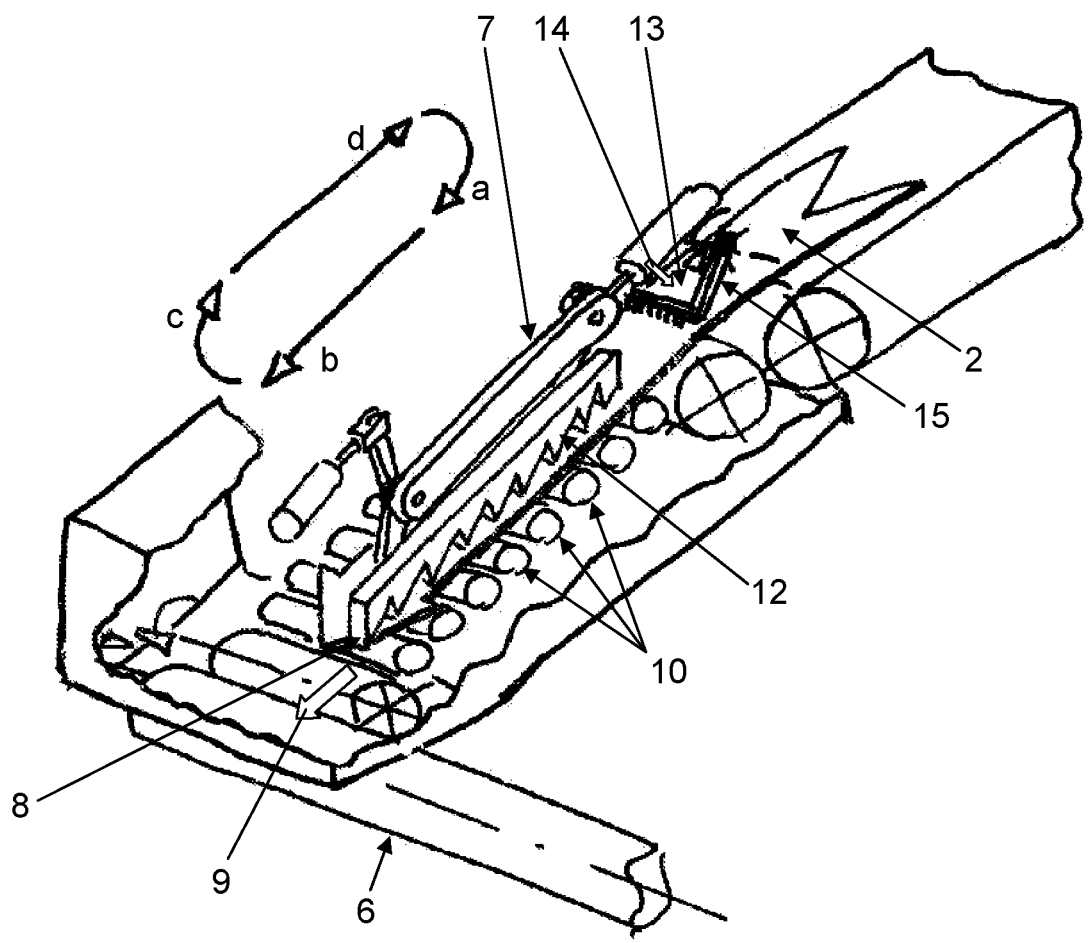
FIG. 2 the conveyor device shown in FIG. 1, comprising a return stop.

In FIG. 2, the conveyor device 7 is additionally provided with a return stop 13, which comprises a shut-off valve 15 which can be deflected by the material strip 2 supplied in the conveying direction 9, against the restoring force of a spring element 14. As a result of this, an overflow of the supply element 5 can be reliably avoided if there is a material jam.

Figure 3:
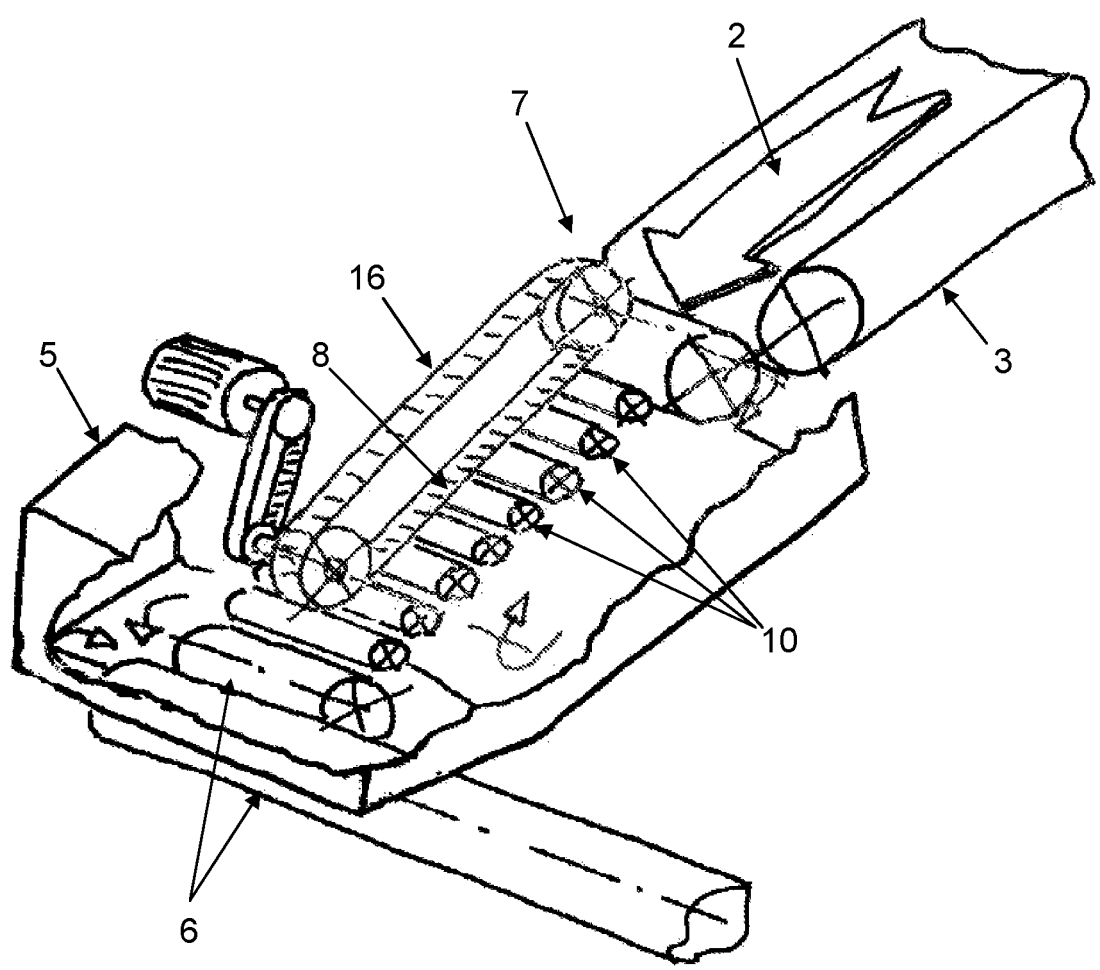
FIG. 3 a variant of the conveyor device shown in FIG. 1, comprising an endlessly circulating conveying belt.

In FIG. 3, which shows a variant of the conveyor device 7 shown in FIG. 1, said device is not provided with a reversing conveying means, but with an endlessly circulating conveying belt 16, which forms the pressure surface 8 for the material strip 2 (not shown). A settable advancement can of course also be provided in this variant in order to adjust the compressive force F acting on the material strip 2.

Figure 4:
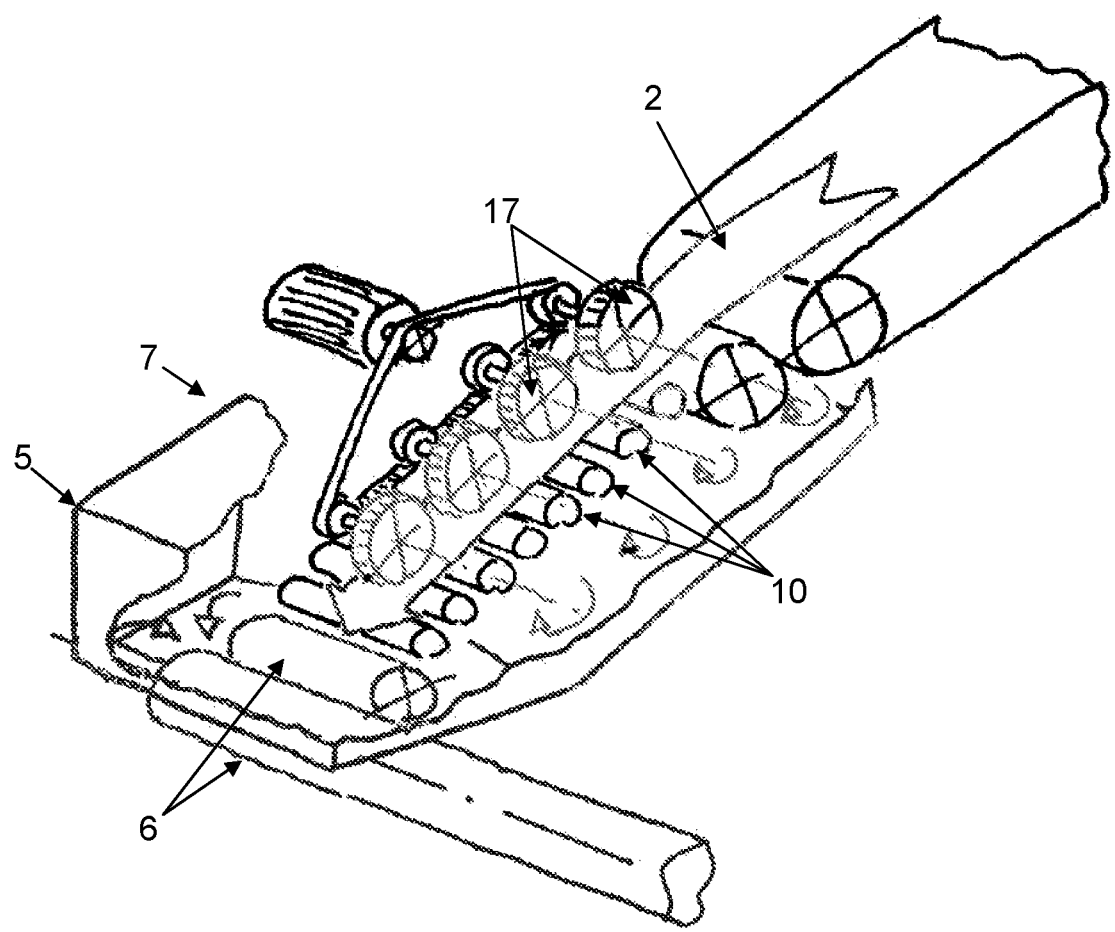
FIG. 4 a variant of the conveyor device shown in FIG. 1, comprising a plurality of driven individual rollers.

In FIG. 4, which shows a variant of the conveyor device 7 shown in FIG. 1, a plurality of individual rollers 17 are provided which are arranged in series and are each driven individually or in unison, to each of which rollers a pair of freely running rollers 10 is assigned as an abutment. The individual rollers 11 can be provided with a suitable surface finish on the periphery thereof and/or can be temperature-controllable.

Figure 5:
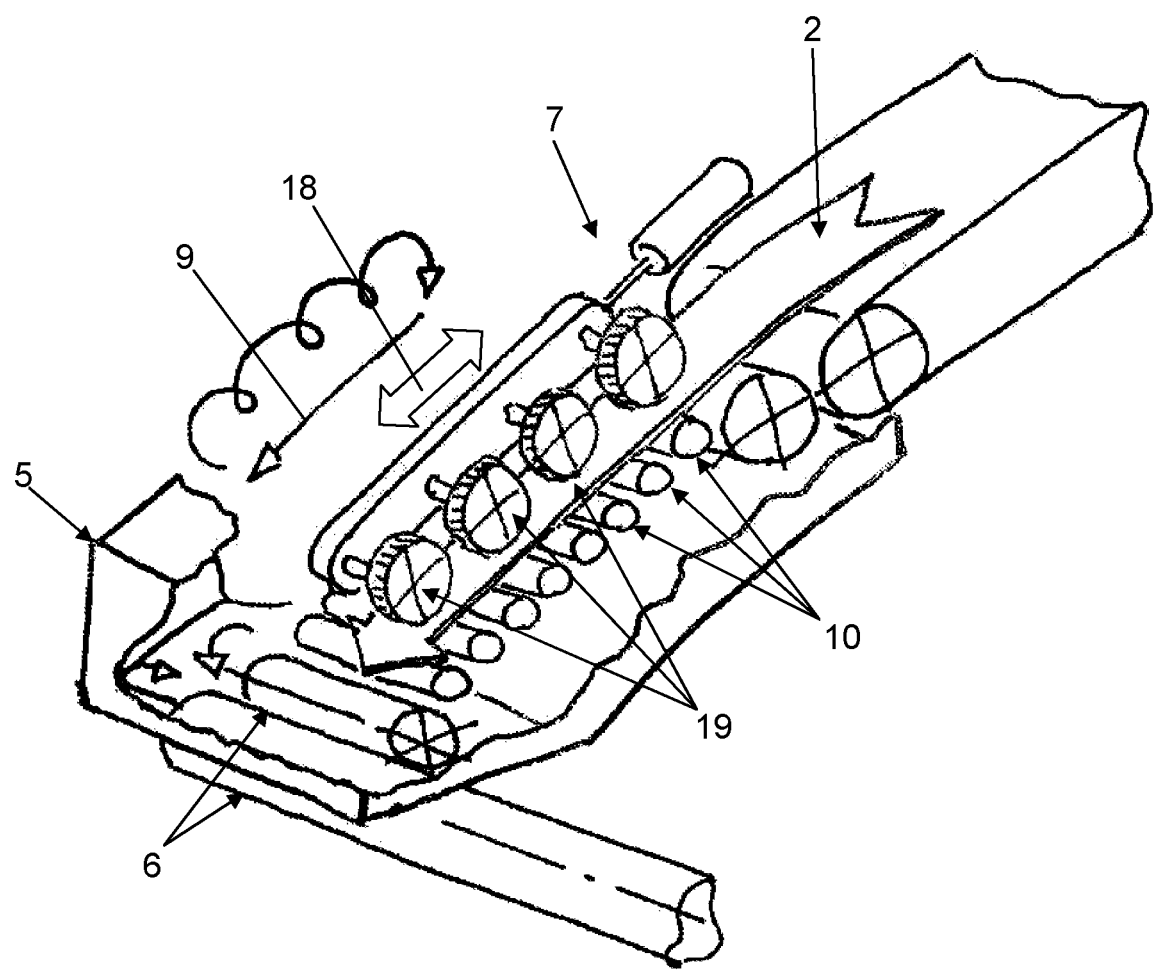
FIG. 5 a variant of the conveyor device shown in FIG. 1, comprising rollers which can be driven in a reversing manner and are limited in terms of their direction of rotation, and which jointly form the pressure surface.

In contrast, FIG. 5 shows a variant of the conveyor device 7 shown in FIG. 1, comprising rollers 19 which jointly form the pressure surface 8, which are translationally movable in a reversing manner in the arrow direction 18, and which are limited in terms of their direction of rotation. As a result of the rollers 19 being provided with a freewheel, the carrier effect only works in the conveying direction 9, in which the rollers 19 are blocked and therefore a corresponding frictional force can be transmitted to the material strip 2. In the opposite direction, the rollers 19 can roll on the material strip 2, resulting in only a very low application of force to the material strip 2.

Figure 6:
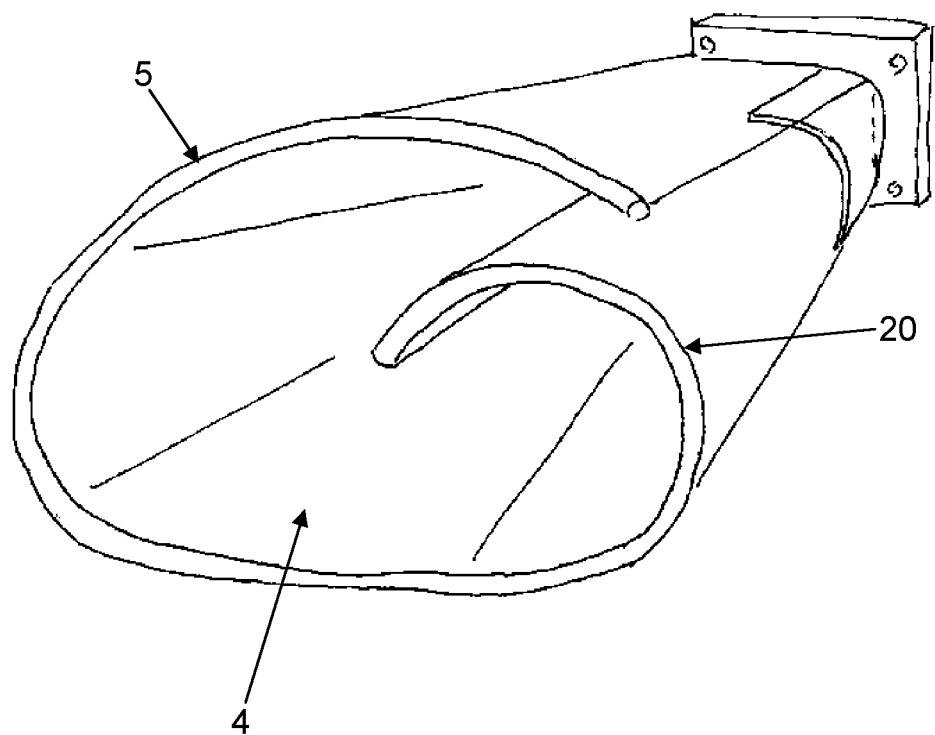
FIG. 6 a funnel-shaped portion of the supply element, comprising a helical delimiting surface.

FIG. 6 shows the funnel-shaped supply region 4 of the supply element 5 comprising a helical delimiting surface 20 which is formed by the wall surface of the supply element 5 such that a first edge of the material strip 2 (not shown) is pushed beneath the opposite edge of the material strip 2. This results in compact winding of the material strip 2, in which the edges are not abutting.

Figure 7:
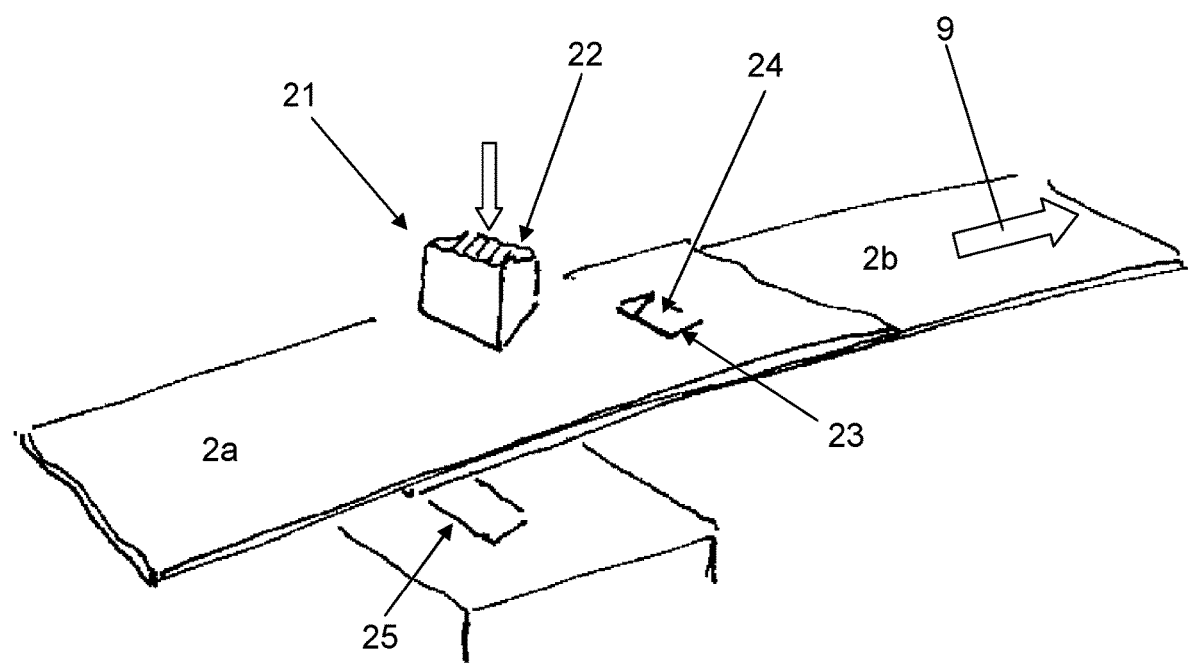
FIG. 7 a splicing device comprising a stamp for connecting two material strips.

Finally, FIG. 7 shows a splicing device 21 comprising a stamp 22 for connecting two material strips 2a, 2b in an overlapping region, which material strips are arranged one after the other. A stamping surface 24 is formed along a separation line 23, which makes a recess in a portion located at the front in the conveying direction 9, which stamping surface is pressed out of the upper material strip 2a into the lower material strip 2b by the stamp 22, and is mechanically clamped there using a die 25. As a result, the material strips 2 are reliably connected and can be supplied to the extruder 6 without interruption.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

LIST OF REFERENCE SIGNS

1 Apparatus
2 Material strip
3 Conveyor belt
4 Supply region
5 Supply element
6 Extruder
7 Conveyor device
8 Pressure surface
9 Conveying direction
10 Roller
11 Bearing surface
12 Profile
13 Return stop
14 Spring element
15 Shut-off valve
16 Conveying belt
17 Individual roller
18 Arrow direction
19 Roller
20 Delimiting surface
21 Spicing device
22 Stamp
23 Separation line
24 Stamping surface
25 Die
F Compressive force
a, b, c, d Movement steps

The invention claimed is:

1. An apparatus for feeding an extruder, the apparatus comprising:
   a material strip comprising rubber or plastic, an upper side, and a lower side;
   a first conveyor comprising a bearing surface, the bearing surface being disposed on the lower side of the material strip, the first conveyor being disposed within a funnel-shaped housing, the funnel-shaped housing leading to the extruder; and
   a motor-driven second conveyor comprising a beam extending linearly in a first direction, a lower side of the beam comprising a pressure surface configured to contact the upper side of the material strip, the second conveyor being configured to linearly translate the pressure surface in the first direction and a second direction, the first direction extending toward the extruder, the second direction extending away from the extruder, the pressure surface being disposed inside the funnel-shaped housing;
   wherein the second conveyor is configured to:
      cause the pressure surface to contact and thereby frictionally engage the upper side of the material strip when the pressure surface is translating in the first direction and while the material strip is in contact with the first conveyor; and
      cause the pressure surface to withdraw, and remain separated, from the material strip when the pressure surface is translating in the second direction.

2. The apparatus of claim 1, wherein the second conveyor is disposed within the funnel-shaped housing between an inlet of the housing and a draw-in roller of the extruder; and
   the first conveyor comprises multiple bearing surfaces, each of which are in contact with the lower side of the material strip.

3. The apparatus of claim 1, wherein the pressure surface is a first pressure surface and the second conveyor comprises a second pressure surface, the first and second pressure surfaces being arranged in parallel and independently movable, the second conveyor configured to:
    operate the first pressure surface in a first cycle where the first pressure surface is translated in the first direction toward the extruder and then translated in the second direction away from the extruder;
    operate the second pressure surface in a second cycle where the second pressure surface is translated in the first direction toward the extruder and then translated in the second direction away from the extruder.

4. The apparatus of claim 3, wherein at least one of the pressure surfaces has a linearly extending sawtooth profile.

5. The apparatus of claim 4, wherein the first conveyor comprises free-running rollers, at least one of which defines the bearing surface.

6. The apparatus of claim 3, wherein the first and second cycles are anti-cyclical such that the first pressure surface is moved in the first direction while the second pressure surface is moved in the second direction and the second pressure surface is moved in the first direction while the first pressure surface is moved in the second direction.

7. The apparatus of claim 1, wherein the housing comprises a delimiting surface that is helical, at least in portions, wherein the housing is delimited such that a first edge of the material strip is pushed beneath the opposite edge of the material strip.

8. The apparatus of claim 1, further comprising:
    a splicing device including a stamp configured to insert a separation line into at least two superimposed material strips.

9. The apparatus of claim 8, wherein the stamp is configured such that one portion of a peripheral contour of the stamp produces the separation line.

10. The apparatus of claim 3, wherein the first conveyor comprises free-running rollers, at least one of which defines the bearing surface.

11. A system, comprising:
    the apparatus of claim 1; and
    the extruder, the extruder being of a screw-type.

12. A method comprising operating the system of claim 11, the method comprising:
    drawing the material strip toward the extruder with the pressure surface when the pressure surface is translating in the first direction.

13. An apparatus for feeding an extruder with a material strip comprising an upper side and a lower side, the apparatus comprising:
    a first conveyor comprising a bearing surface for supporting the lower side of the material strip, the first conveyor being disposed with within a funnel-shaped housing, the funnel-shaped housing leading to the extruder; and
    a motor-driven second conveyor, the second conveyor comprising a beam extending linearly in a first direction, a lower side of the beam comprising a pressure surface configured to contact the upper side of the material strip, the second conveyor being configured to linearly translate the pressure surface in the first direction and a second direction, the first direction extending toward the extruder, the second direction extending away from the extruder, the pressure surface being disposed inside the funnel-shaped housing;
    the second conveyor being configured to:
    cause the pressure surface to contact and thereby frictionally engage the upper side of the material strip when the pressure surface is translating in the first direction; and
    cause the pressure surface to withdraw, and remain separated, from the material strip when the pressure surface is translating in the second direction.

14. A method of feeding an extruder with an apparatus, the apparatus comprising:
    a material strip comprising rubber or plastic, an upper side, and a lower side;
    a first conveyor comprising a bearing surface, the bearing surface being disposed on the lower side of the material strip, the first conveyor being disposed within a funnel-shaped housing, the funnel-shaped housing leading to the extruder; and
    a motor-driven second conveyor, the second conveyor comprising a beam extending linearly in a first direction, a lower side of the beam comprising a pressure surface configured to contact the upper side of the material strip, the second conveyor being configured to linearly translate the pressure surface in the first direction and a second direction, the first direction extending toward the extruder, the second direction extending away from the extruder, the pressure surface being disposed inside the funnel-shaped housing;
    the method comprising configuring the second conveyor to:
    cause the pressure surface to contact and thereby frictionally engage the upper side of the material strip when the pressure surface is translating in the first direction; and
    cause the pressure surface to withdraw, and remain separated, from the material strip when the pressure surface is translating in the second direction.

* * * * *